United States Patent [19]

Rodriguez

[11] Patent Number: 5,119,720
[45] Date of Patent: Jun. 9, 1992

[54] APPARATUS FOR PROCESSING PRODUCTS IN LARGE SEALED DRUMS

[76] Inventor: Henry Rodriguez, Rte. 1, Box 73-K, McNeal, Ariz. 85617

[21] Appl. No.: 820,444

[22] Filed: Dec. 16, 1991

Related U.S. Application Data

[63] Continuation of Ser. No. 498,967, Mar. 19, 1990, abandoned.

[51] Int. Cl.⁵ .............................................. A23B 4/08
[52] U.S. Cl. ......................................... 99/517; 99/348; 99/355; 99/360; 99/371; 99/427; 99/443 R; 99/470; 99/483; 134/142; 134/153; 165/109.1
[58] Field of Search ................ 99/352, 354, 355, 356, 99/348, 359–371, 427, 443 R, 443 C, 470, 483, 516, 517; 366/144, 146, 214, 235; 134/142, 153, 159; 62/374, 378, 381; 165/109.1; 422/304, 303, 302, 300

[56] References Cited

U.S. PATENT DOCUMENTS

| | | | |
|---|---|---|---|
| 153,791 | 8/1874 | Stearns et al. | 366/213 |
| 349,936 | 9/1886 | Getchell. | |
| 423,362 | 3/1890 | Wells. | |
| 724,308 | 3/1903 | Marsh. | |
| 754,122 | 3/1904 | Bucklin | 366/235 |
| 769,330 | 9/1904 | Timby. | |
| 1,174,189 | 3/1916 | Smith. | |
| 1,432,671 | 10/1922 | Comer. | |
| 1,480,186 | 1/1924 | Smith | 99/371 |
| 1,646,577 | 10/1927 | Chapman | 99/366 |
| 1,651,730 | 3/1927 | Sanguinett. | |
| 2,021,261 | 5/1935 | Moore. | |
| 2,141,337 | 12/1938 | Bailey | 366/146 |
| 2,517,542 | 8/1950 | Clifcorn. | |
| 2,617,635 | 11/1952 | Ash. | |
| 2,748,005 | 8/1952 | Baier. | |
| 3,209,673 | 10/1965 | Howard. | |
| 3,231,244 | 1/1966 | Moody. | |
| 3,302,655 | 2/1967 | Sasaki et al. | 134/142 |
| 3,417,973 | 6/1967 | Englander. | |
| 3,614,434 | 10/1971 | Horwitz. | |
| 3,614,924 | 10/1971 | Hickey | 134/159 X |
| 4,137,835 | 2/1979 | Petersen | 99/348 |
| 4,157,061 | 6/1979 | Margus, Jr. | 99/352 |
| 4,301,718 | 11/1981 | Lewinger | 99/359 |
| 4,329,068 | 5/1982 | Neuner | 366/214 |
| 4,385,035 | 5/1983 | Akitoshi et al. | 99/261 |
| 4,446,779 | 5/1984 | Hubbard | 99/472 |
| 4,720,194 | 1/1988 | Friedland | 366/235 |
| 4,723,377 | 2/1988 | Watts | 134/153 X |

FOREIGN PATENT DOCUMENTS

| | | | |
|---|---|---|---|
| 682623 | 3/1964 | Canada | 99/371 |
| 2203590 | 8/1973 | Fed. Rep. of Germany | 134/153 |

*Primary Examiner*—Timothy F. Simone
*Attorney, Agent, or Firm*—LaValle D. Ptak

[57] ABSTRACT

Apparatus is disclosed for cooling large sealed drums (typically fifty-five gallon drums) of cooked food products. The size of such large drums makes them difficult to handle, since they typically weigh in excess of five hundred pounds when full. The cooling apparatus comprises a main frame structure which has a support shaft rotatably attached to it and elevated above the base of the frame a distance sufficient to provide clearance for a vertically oriented drum to pass underneath it. The support shaft has a support frame on it with six, equally spaced, radially arranged, drum support platforms and clamp members attached to it. A drum is rolled onto one of these platforms from an adjacent fixed platform. Once it is in place, it is clamped onto the support frame, and the next support platform is rotated into place. Once drums are located in all six of the positions, the device is continuously rotated in a cooling water spray to rapidly cool the contents of the drums. The rotation causes a tumbling action of the contents to ensure a mixing of the contents to bring all of the contents into contact with the inner surface of the drum during the cooling operation, so that cooling is rapidly and effectively accomplished.

14 Claims, 2 Drawing Sheets

APPARATUS FOR PROCESSING PRODUCTS IN LARGE SEALED DRUMS

This is a continuation of application Ser. No. 07/498,967, filed Mar. 19, 1990, now abandoned.

BACKGROUND

In the food processing industry, it is common to prepare many products in sealed containers. Typical products include fruits and vegetables, as well as various condiments which typically are packed in liquid. The products are placed in containers along with any liquid and the containers are sealed. Processing typically is completed by heating the containers to a temperature of 200° F. or so, for the purpose of cooking the ingredients and destroying any bacteria which may be present. In some cases, the containers first are hot filled with product at such an elevated temperature and then, immediately subsequent to filling, are sealed.

Immediately after the sealing and heating of the containers is completed, the containers are cooled to prevent thermophilic spoilage and also to ensure that the end product in the container is as firm or crispy as possible. It has been found that the faster the entire contents of the container can be cooked or heated and then cooled, the better is the quality of the end product when the container subsequently is opened for consumption.

Typically the containers which are used for processed food products are relatively small cans or bottles weighing a total of something less than one pound up to five or six pounds at the most. Consequently, the apparatus which is used to cook and cool such containers needs only to be capable of handling the relatively low weights and small sizes of such containers.

It has been common in the past to place the cans or bottles, after they have been filled and sealed, in a retort which then is closed. A heating medium, such as steam, is directed into the retort under pressure to reach the desired processing temperature. In such apparatus, however, the food product in the container remains stationary, so that a relatively long interval of time is necessary for the transfer of heat from the walls of the container to the center of the food product therein. Similarly, when the product is cooled in the retort by the introduction of cold water or some other cooling medium, a relatively long time is required to ensure that the food in the center of the container reaches the final cooling temperature. It is possible to overcook a portion of the contents of the container, and also it is possible that the center of the container may not be properly cooled, unless relatively long cooling times are employed.

To shorten the cooking and cooling time of foods being processed in sealed containers, various techniques for agitating the contents of the container, while the container is in contact with either a heating or cooling medium, have been developed. One such device is diagrammatically shown and described in the Clifcorn U.S. Pat. No. 2,517,542. The Clifcorn Patent is directed to a heat exchange device for cooking and/or cooling canned food products which are placed in relatively small cans. While the cans are in the heat exchange medium, they are rotated end-over- end to agitate the product in the can by shifting the head space in the can from one end to the other through each complete revolution of the can. This causes a stirring of the contents to move the food product continuously over the heated or cooled surface of the can to hasten the heat transfer to the center of the can. In addition, this ensures a more uniform heat transfer. This patent does not disclose any actual apparatus for accomplishing the desired purpose, but primarily is directed to a diagrammatic representation of the desired motion.

Another patent which accomplishes a result similar to that which is attained by the action described in the Clifcorn Patent is the Lewinger U.S. Pat. No. 4,301,718. Lewinger also discloses a structure for rotating the food being processed in cans by rotating the cans in a circular path about a central axis while they are in a heating and cooling device. As a consequence, it is possible to shorten the heating and cooling times. An end-over-end tumbling of the contents of the food inside the cans is effected by this apparatus. The manner in which the cans are loaded into the apparatus, and removed from it, is not shown. Essentially, the apparatus is an elongated cylindrical retort with a central rotating cylinder having a number of longitudinal channels in which the cans are placed on their sides about the periphery of the rotating cylinder located within the retort.

Two earlier patents, the Smith U.S. Pat. No. 1,174,189 and the Comer U.S. Pat. No. 1,432,671, also are of interest for a showing of end-over-end heating-/cooling devices for canned or bottled products. In the apparatus disclosed in both of these patents, multiple cans or multiple bottles are carried in different sections. The different sections are in the form of baskets or rotating devices which then are rotated about a central axis to periodically invert the cans or bottles during the processing operation.

A Ash U.S. Pat. No. 2,617,635, discloses a device for inverting cartons of bottled beverages to facilitate mixing of the contents. A rotating rack is employed for inverting the beverage containers.

While the foregoing patents are directed to various devices for shortening the heating and cooling times required for processing foods and beverages, none of the patents are suitable for handling foods which are "canned" or packaged in large drums, such as fifty-five gallon drums. There is a need in the food processing industry, however, for a variety of products packaged in such large containers. For example, chilis and similar products are "canned" in fifty-five gallon drums for sale to food processors who then utilize the contents of such drums in further processing. Also, foods packaged in fifty-five gallon drums are utilized by high volume restaurants and the like, since it is much more economical to purchase such foods in fifty-five gallon drum containers than in a large number of smaller containers.

The problems of minimizing the heating and cooling times of foods processed in fifty-five gallon drums are significantly multiplied over those which exist for small containers, simply by virtue of the fact of the large size of the drums and the large amount of food which is contained in the drums, typically over five hundred pounds.

Because fifty-five gallon drums are so large, it has not been possible to employ the simple devices of the type described above to achieve agitation of the contents during the heating and cooling operations.

Accordingly, it is an object of this invention to provide a mechanism for facilitating the heat exchange of the contents in large sealed drums, particularly fifty-five gallon drums or the like, in a food processing operation.

SUMMARY OF THE INVENTION

Accordingly, it is an object of this invention to provide an improved heat exchange apparatus for a food processing operation.

It is another object of this invention to provide an improved heat exchange apparatus for fifty-five gallon drums filled with semi-liquid material.

It is another object of this invention to provide an improved food processing heat exchange apparatus for reducing the time required for a uniform heat exchange with the contents of large drums of material.

In accordance with a preferred embodiment of this invention, an apparatus for effecting a heat exchange processing of products, such as food products in large sealed drums, includes a main frame capable of supporting the weight of several such drums. A horizontally oriented shaft is supported by the main frame for rotation thereon. The shaft has a support frame attached to it for rotation with it. The support frame has spaced-apart, radially-extending, drum holding members on it for holding the drums at different spaced radial positions about the shaft to effect an end-over-end movement of the drums as the shaft rotates. Consequently, the contents of the drums are agitated during the rotation. Provision is made for facilitating the loading and unloading of the drums to and from the drum holding members, and the exteriors of the drums are placed in contact with a heat exchange medium during rotation.

DETAILED DESCRIPTION

Figure 1:
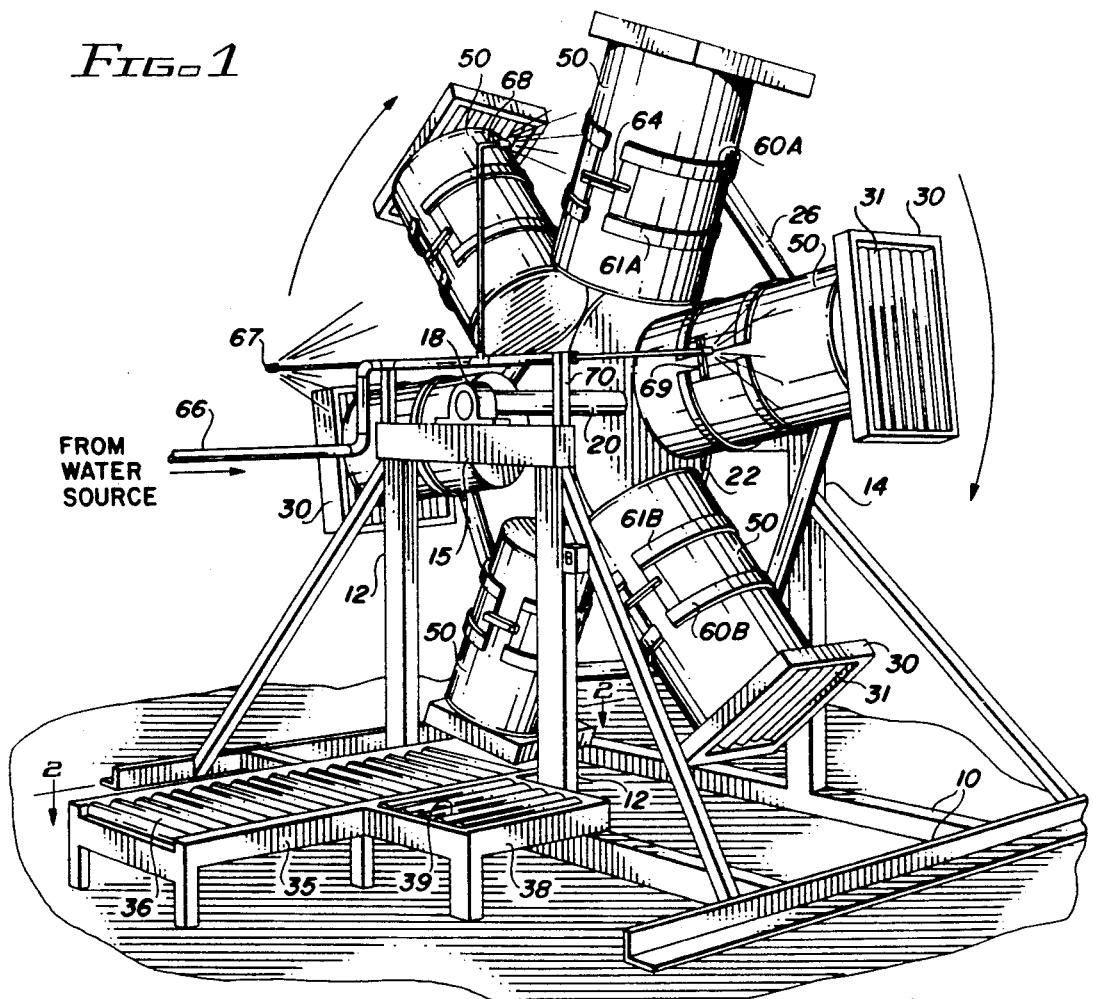
FIG. 1 is a perspective view of a preferred embodiment of the invention.

Reference now should be made to the drawings in which the same reference numbers are used in the various figures to designate the same components.

As illustrated in the drawings, the apparatus disclosed is designed primarily to cool fifty-five gallon sealed drums which previously have been hot filled with food products. The drums and the products with which they are filled are heated to approximately 200° F. and then sealed. A space is left between the top of the product filling the drum and the lid or seal which is placed on the drum. Typical products which are "canned" in this manner include chilis, tomatoes, and the like. Large fifty- five gallon containers are employed for the purpose of subsequent utilization in large scale food processing operations.

The chilis, tomatoes, or other foods to be placed in the drums are heated in any suitable manner in large kettles or containers, which then are poured into the drums. It is necessary to cool the hot drums as rapidly as possible to prevent thermophilic spoilage and to ensure a crispy end product. As mentioned previously, it is known that heat removal is facilitated, and the time required for heat removal to any desired end point is most readily accomplished, by agitation of the contents of the container. For fifty-five gallon drums weighing approximately five hundred thirty pounds each, however, end-over-end agitation in a cooling medium is difficult.

The apparatus illustrated includes a main frame, typically made of steel or other suitable materials, including a generally rectangular base 10 with a pair of spaced upright beams 12 on the front side and a pair of spaced upright beams 14 on the rear side. At the upper ends of the beams 12, a horizontal beam 15 is attached; and a similar beam 16 is attached across the upper ends of the beams 14. Bearing blocks 18 and 19 are mounted on the tops of the beams 15 and 16, respectively, and a shaft 20 is journaled in the bearings in the blocks 18 and 19. The shaft 20 is oriented with its axis horizontal or parallel to the base 10 of the main frame.

Figure 3:
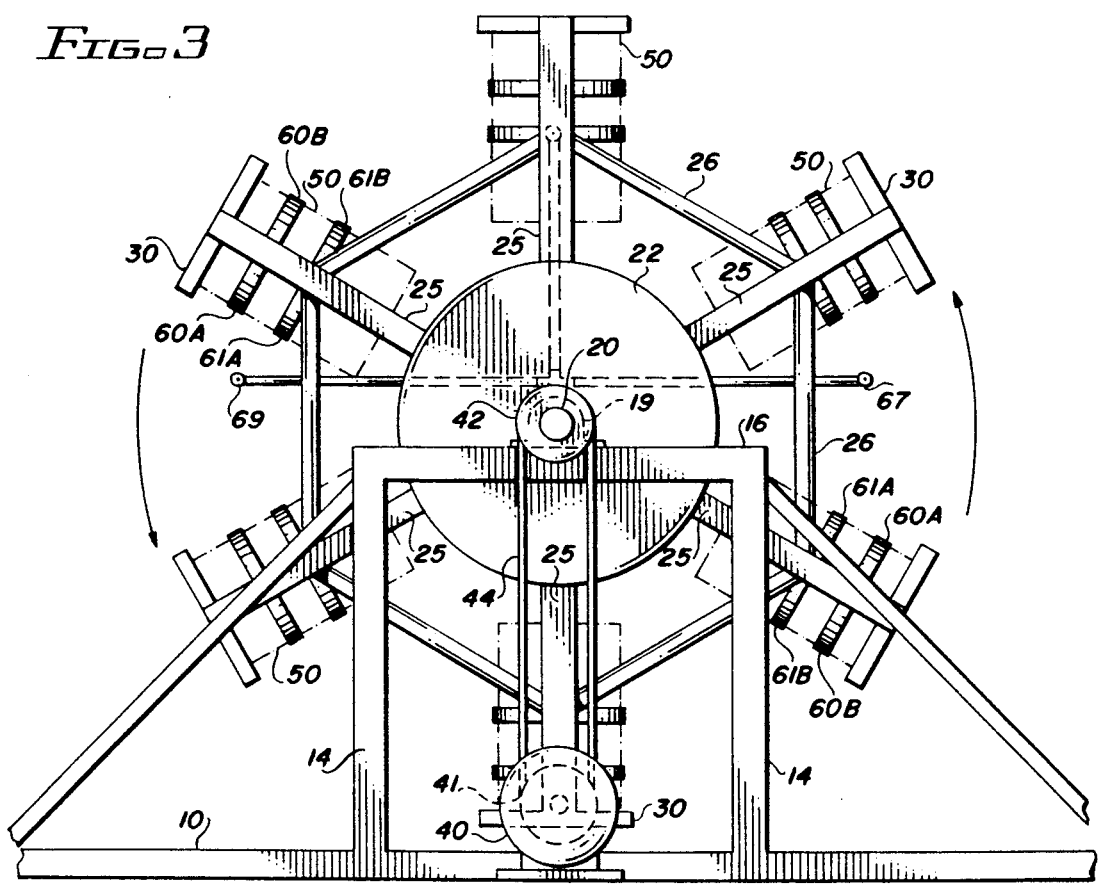
FIG. 3 is a rear view of the embodiment shown in FIG. 1.

As shown most clearly in FIG. 3, a circular steel plate 22 is welded or otherwise securely attached to the shaft 20 for rotation with the shaft, just inside the horizontal upper beam 16 of the main frame. The plate 20 has six radially extending support arms 25 welded to it; and a cross-bracing system, comprising six brace members 26, is welded or otherwise securely attached to the radially extending arms 25 to provide a rigid strong assembly. This entire assembly rotates with the plate 22 as the shaft 20 is rotated.

Figure 2:
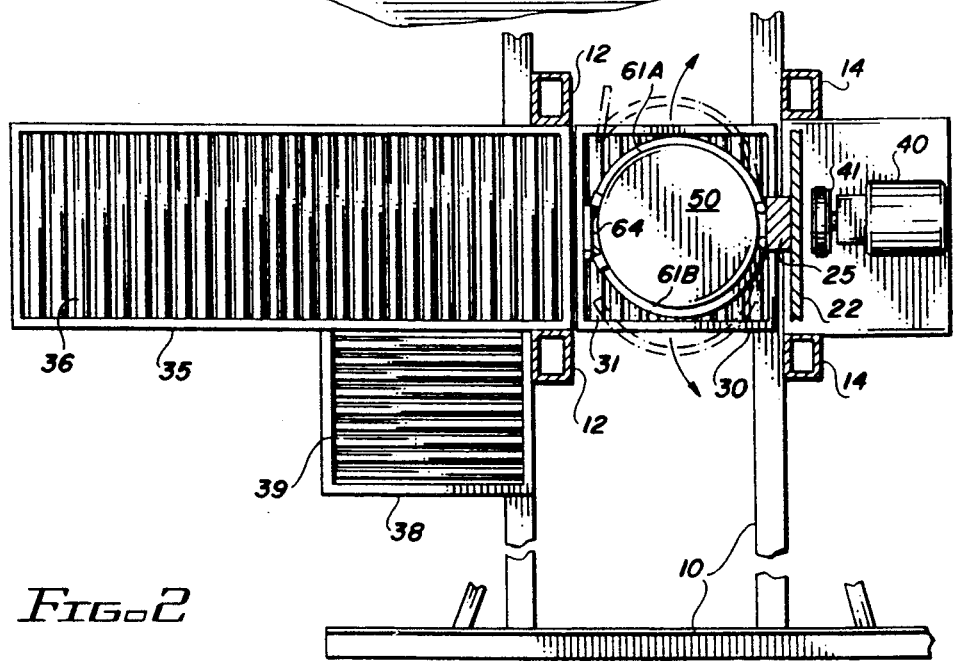
FIG. 2 is a top view taken along the line 2—2 of FIG. 1 showing details of a portion of the embodiment of FIG. 1.

The outer ends of the radially extending arms 25 each have a rectangular platform 30 attached to them. When a platform 30 is in its lowermost position, its upper surface is in the same plane as the upper surface of an elongated rectangular platform 35, shown most clearly in FIGS. 1 and 2. The upper surface of the platform 35 has a series of side-by-side elongated cylindrical rollers 36 extending across it and these rollers rotate about axes parallel to this upper surface. The upper surfaces of each of the platforms 30 have a similar set of side-by-side parallel rotatable rollers 31 located on them. When a platform 30 on the end of any one of the arms 25 is rotated to its lowermost position, as shown most clearly in FIGS. 2 and 3, the platform 30 is aligned with the platform 35; and the rollers 31 and 36 form a continuous roller surface. This roller surface is such that when a forklift truck or other suitable means delivers a filled fifty-five gallon drum 50 to the left-hand end of the platform 35 (as shown in FIGS. 1 and 2) the drum 50 then readily can be rolled along the rollers 36 of the platform 35 onto the platform 30 in the load/unload position by rolling it on the rollers 31 located on that platform. This is shown most clearly in FIG. 2.

A pair of semi-circular holding arms or holding clamp members 60A/61A and 60B/61B are attached by hinges at one end to each of the arms 25 at a location which is approximately at the midpoint of a drum 50 when it is placed on the rollers 31 of the platforms 30. These holding arms are shown most clearly in FIG. 4 and are illustrated also in FIG. 2. The holding arms can be pivoted dotted-line position, as shown in both FIGS. 2 and 4, to a closed position illustrated in solid lines in both FIGS. 2 and 4.

Figure 4:
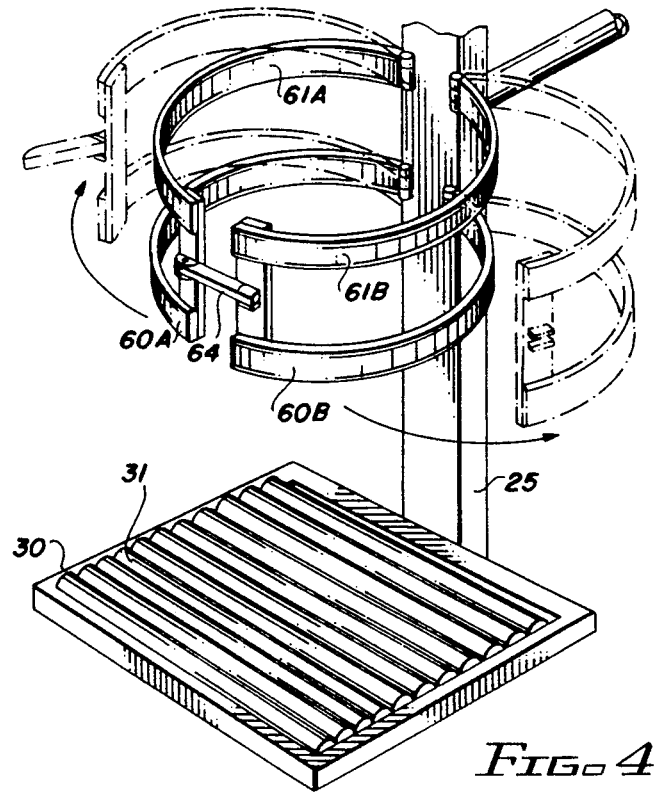
FIG. 4 is a detailed perspective view of a portion of the embodiment of FIG. 1.

When a barrel 50 is placed in the position shown in FIG. 2, the holding arms 60A/61A and 60B/61B then are closed from the dotted line position to the solid line position. An over centering clamp 64, of a type commonly used for attaching such devices, is moved in place to tightly secure the open ends of the arms 60A/61A, 60B/61B together, as shown in FIGS. 1, 2 and 4, around the center of the barrel 50 to securely hold it in place. Typically, the barrels 50 also have spaced ridges about them, and the arms 60A/61A, 60B/61B are spaced to cause them to be located either directly above or directly below such ridges to further enhance the holding capabilities of the arms. Thus, a barrel 50 is placed on the rollers 31 of the platform 30, and the arms 60A/61A and 60B/61B are secured by the clamp 64 across the central portion thereof, as shown in FIG. 1.

The apparatus is rotated by a motor 40 which drives a pully 41 attached to an upper pully 42, which, in turn, is secured to the shaft 20 to rotate the shaft. Initially, when the device is first being loaded, the rotation is stepped 60° to locate the next platform 30 with its roller surface 31 in the position shown in FIG. 2. A second drum 50 then is rolled into position and secured. This operation is repeated until six drums 50 are secured on the six platforms 30 in the manner shown in FIG. 1.

Once six drums are in place (or a lesser number if desired), the motor 40 is operated to rotate the shaft 20 continuously, and therefore all six drums 50, at approximately sixty revolutions per minute. The rotational speed can be greater or less than this amount, but this has been found to be sufficient to cause a thorough tumbling and mixing of the contents of the drums from end-to-end as the shaft 20 is rotated.

Cooling of the drums 50 during the rotation of the shaft 20 by the motor 40 is effected by supplying cold water from a source (not shown) through a pipe 66 and to a distributor terminating in a plurality of nozzles 67, 68, and 69, as shown in FIGS. 1 and 3. This cold water sprays over the drums 50 continuously during the rotation of the drums by the motor, and the hotter material on the interior of the drums 50 moves about inside the drums exposing it to the ends and sides to facilitate cooling.

After the drums 50 have been cooled to the desired temperature, the device is stopped with one of the arms 25 in its vertical, lowermost position, as shown in FIG. 3. This aligns the rollers 31 of the platform 30 with the rollers 36 on the top of the platform 35, as shown in FIG. 2. The drum 50 is then rolled outwardly just past the uprights 12 at the front of the apparatus. Then the drum is moved to the right, as shown in FIG. 1, onto a shorter platform 38 having an upper roller surface 39 which is similar to the roller surfaces 31 and 36 of the platforms 30 and 35, respectively. A new drum 50 then can be placed in position for cooling, and the next cooled drum 50 rolled into place on the platform 38 after a forklift truck or other suitable device removes the previous drum from the platform 38.

Even though the total weight of the six drums on the device is in excess of three-thousand pounds, and even though each drum weighs in excess of five hundred pounds, as explained earlier, a single person easily can load and unload the apparatus; so that the overall labor cost of operating the apparatus is minimal. In addition, the amount of effort also is minimal and the time required to load and unload the drums is very short, typically a matter of a few seconds.

The foregoing description of the preferred embodiment of the invention should be considered as illustrative of the invention and not as limiting. Various changes and modifications will occur to those skilled in the art without departing from the true scope of the invention, as defined in the appended claims. For example, a different type of clamping mechanism may be utilized to hold the drums in place instead of the over-centering clamp which has been described. The particular number of drums on the device can be varied in accordance with different applications and may be less than the six which have been illustrated, or a greater number than six. The manner in which the shaft 20 is rotated also can be varied in accordance with different operating conditions or applications.

What is claimed is:

1. Apparatus for processing products in large sealed drums, including in combination:
    main frame means;
    an elongated shaft supported for substantially horizontal rotation about the axis thereof on said main frame means;
    support frame means attached to said shaft for rotation therewith;
    a plurality of drum holding members in the form of drum clamping means attached to said support frame means for individually, releasably holding drums of products at different spaced radial positions about said shaft, with the central axes of said drums extending radially outwardly from the axis of said shaft to effect end over end movement of such drums as said shaft rotates;
    a separate support platform means on said frame means and associated with each of said drum holding members for supporting said drums in a loading position thereof and for facilitating the loading and unloading of drums to and from said drum holding members; and
    heat exchange means for changing the temperature of the contents of such drums.

2. Apparatus for processing products in large scaled drums, including in combination:
    main frame means;
    an elongated shaft supported for substantially horizontal rotation about the axis thereof on said main frame means;
    support frame means attached to said shaft for rotation therewith;
    a plurality of drum clamping means attached to said support frame means for releasably holding drums of products at different spaced radial positions about said shaft to effect end over end movement of such drums as said shaft rotates, said drum clamping means comprising hinged over-center clamping means for encircling such drums substantially about the midpoint thereof and clamping such drums securely in position on said support frame means during rotation thereof;
    means for facilitating the loading and unloading of drums to and from said drum holding members; and
    heat exchange means for changing the temperature of the contents of such drums.

3. Apparatus for processing products in large sealed drums, including in combination:
    main frame means;
    an elongated shaft supported for substantially horizontal rotation about the axes thereof on said main frame means;
    support frame means attached to said shaft for rotation therewith;
    a plurality of drum holding members on said support frame means for holding drum of products at different spaced radial positions about said shaft to effect end over end movement of such drums as said shaft rotates;
    means for facilitating the loading and unloading of drums to and from said drum holding members including support platform means associated with each of said drum holding members with roller means thereon for rolling drums onto and off said platform means and for supporting said drums in a loading position thereof; and heat exchange means for changing the temperature of the contents of such drums.

4. The combination according to claim 3 further including means for rotating said shaft.

5. The combination according to claim 1 wherein said drum holding members are equally radially spaced from one another about said shaft.

6. The combination according to claim 5 wherein said drum holding members include drum clamping means attached to said support frame means.

7. The combination according to claim 6 wherein said drum clamping means comprise means for encircling said drums and releasably clamping said drums substantially about the center thereof to secure said drums to said support frame means for rotation therewith.

8. The combination according to claim 7 wherein said drum holding members comprise hinged over-center clamping means for encircling such drums substantially about the midpoint thereof and clamping such drums securely in position on said support frame means during rotation thereof.

9. The combination according to claim 8 wherein said heat exchange means comprises water spray means located for spraying water on drums as such drums are rotated thereby.

10. The combination according to claim 9 further including a supply roller platform means aligned with said support platform means when said support platform means are in the lowermost rotational position thereof for facilitating the movement of a drum from said supply roller platform means onto said support platform means for the purpose of loading and unloading drums onto and from said apparatus.

11. The combination according to claim 10 wherein drums processed by said apparatus comprise standard fifty-five (55) gallon drums.

12. The combination according to claim 3 further including a supply roller platform means aligned with said support platform means when said support platform means are in the lowermost rotational position thereof for facilitating the movement of a drum from said supply roller platform means onto said support platform means for the purpose of loading and unloading drums onto and from said apparatus.

13. The combination according to claim 1 wherein drums processed by said apparatus comprise standard fifty-five (55) gallon drums.

14. The combination according to claim 1 wherein said heat exchange means comprises water spray means located for spraying water on drums as such drums are rotated thereby.

* * * * *